United States Patent
Moriwaki et al.

(10) Patent No.: US 10,969,101 B2
(45) Date of Patent: Apr. 6, 2021

(54) MAIN NOZZLE, COMBUSTOR, AND METHOD FOR MANUFACTURING MAIN NOZZLE

(71) Applicant: MITSUBISHI HEAVY INDUSTRIES, LTD., Tokyo (JP)

(72) Inventors: Atsushi Moriwaki, Tokyo (JP); Kenji Miyamoto, Tokyo (JP); Keijiro Saito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 295 days.

(21) Appl. No.: 16/312,717

(22) PCT Filed: Dec. 15, 2017

(86) PCT No.: PCT/JP2017/045074
§ 371 (c)(1),
(2) Date: Dec. 21, 2018

(87) PCT Pub. No.: WO2018/116975
PCT Pub. Date: Jun. 28, 2018

(65) Prior Publication Data
US 2019/0323710 A1    Oct. 24, 2019

(30) Foreign Application Priority Data
Dec. 20, 2016 (JP) .............................. JP2016-247156

(51) Int. Cl.
*F23N 5/10* (2006.01)
*F23R 3/28* (2006.01)
(Continued)

(52) U.S. Cl.
CPC ............. *F23N 5/105* (2013.01); *F23N 5/245* (2013.01); *F23R 3/286* (2013.01); *F01D 25/00* (2013.01);
(Continued)

(58) Field of Classification Search
CPC .... F23R 3/00; F23R 3/286; F23R 3/30; F23R 3/14; F01D 25/00; F02C 9/00; F23N 5/105; F23N 5/245
See application file for complete search history.

(56) References Cited

U.S. PATENT DOCUMENTS 8,894,408 B2 * 11/2014 Bulat ........................ F23N 5/16
431/13
9,518,740 B2 * 12/2016 Biagioli .................... F23R 3/14
(Continued)

FOREIGN PATENT DOCUMENTS

| CN | 101109395 | 1/2008 |
| CN | 101949540 | 1/2011 |

(Continued)

OTHER PUBLICATIONS

International Search Report dated Feb. 27, 2018 in International (PCT) Application No. PCT/JP2017/045074.

*Primary Examiner* — Craig Kim
(74) *Attorney, Agent, or Firm* — Wenderoth, Lind & Ponack, L.L.P.

(57) ABSTRACT

The present invention provides a main nozzle of a combustor, a plurality of the main nozzles are to be installed on an outer peripheral side of a pilot nozzle of the combustor at an interval in a circumferential direction of the pilot nozzle, the main nozzle includes a main nozzle body extending in an axial line; a swirl vane protruded from an outer peripheral surface of the main nozzle body in a radial direction of the axial line, and is configured to allow a fluid flowing downstream in a direction of the axial line to swirl around the axial line; and temperature sensors installed on the main nozzle body so as to be disposed on a tangential line to a mean line of the swirl vane drawn between a vane ventral
(Continued)

surface and a vane dorsal surface of the swirl vane, at a downstream end portion of the swirl vane.

3 Claims, 4 Drawing Sheets

(51) Int. Cl.
| | | |
|---|---|---|
| *F01D 25/00* | (2006.01) | |
| *F23R 3/14* | (2006.01) | |
| *F23N 5/24* | (2006.01) | |
| *F23R 3/34* | (2006.01) | |
| *F23R 3/36* | (2006.01) | |

(52) U.S. Cl.
CPC ...... *F23N 2225/16* (2020.01); *F23N 2231/28* (2020.01); *F23N 2241/20* (2020.01); *F23R 3/14* (2013.01); *F23R 3/343* (2013.01); *F23R 3/36* (2013.01)

(56) References Cited

U.S. PATENT DOCUMENTS

| | | | |
|---|---|---|---|
| 10,024,532 B2 * | 7/2018 | Kimura | F23N 5/242 |
| 10,378,456 B2 * | 8/2019 | Stuttaford | F23R 3/286 |
| 10,718,522 B2 * | 7/2020 | Kajimura | F23R 3/26 |
| 2003/0106321 A1 * | 6/2003 | Von Der Bank | F23R 3/286 60/776 |
| 2003/0121266 A1 | 7/2003 | Modi et al. | |
| 2008/0148736 A1 * | 6/2008 | Ishizaka | F23R 3/14 60/737 |
| 2011/0005189 A1 * | 1/2011 | Uhm | F23N 5/242 60/39.281 |
| 2014/0041389 A1 | 2/2014 | Kajimura et al. | |
| 2015/0362193 A1 | 12/2015 | Inoue et al. | |

FOREIGN PATENT DOCUMENTS

| | | | | |
|---|---|---|---|---|
| CN | 102782258 | | 11/2012 | |
| CN | 103210257 | | 7/2013 | |
| CN | 104534474 | | 4/2015 | |
| JP | 2003-207130 | | 7/2003 | |
| JP | 2006-336996 | | 12/2006 | |
| JP | 2013-518215 | | 5/2013 | |
| JP | 2014-149127 | | 8/2014 | |
| JP | 2017180324 A | * | 10/2017 | F02C 7/232 |
| WO | 2011/094658 | | 8/2011 | |

* cited by examiner even when the temperature sensor is provided at the distal end of the nozzle, detection of flashback may be slow in some cases, and therefore more detailed monitoring of temperature is desired.

An object of the present invention is to provide a main nozzle which prevents itself from thermally damaging by firing caused by anomalous combustion such as flashback, a combustor having the main nozzle, and a method for manufacturing the main nozzle.

Solution to Problem

A first aspect of the present invention is a main nozzle of a combustor, wherein a plurality of the main nozzles are to be installed on an outer peripheral side of a pilot nozzle of the combustor at an interval in a circumferential direction of the pilot nozzle. That is, the main nozzle includes: a main nozzle body extending in an axial line thereof; a swirl vane protruded from an outer peripheral surface of the main nozzle body in a radial direction of the axial line, and is configured to allow a fluid flowing downstream in a direction of the axial line to swirl around the axial line; and a plurality of temperature sensors installed on the main nozzle body so as to be disposed along a tangential line to a mean line of the swirl vane which is drawn between a ventral surface and a dorsal surface of the swirl vane, at a downstream end portion of the swirl vane.

According to such a configuration of the main nozzle, since the plurality of temperature sensors are installed on an outer surface of the main nozzle body, detailed monitoring of temperature of the main nozzle body can be performed. Specifically, it is possible to understand the temperature distribution in a plane with a plurality of measurement points.

In addition, since the temperature sensors are installed on the tangential line on which a flow velocity of the fluid slows down, the flashback can be easily detected when the air-fuel premixture formed by swirl of the air is combusted. That is, since the flow velocity of the fluid slows down on the tangential line, the risk of the flashback becomes high, but by providing the temperature sensor at the corresponding position, it is possible to easily detect the flashback.

A second aspect of the present invention is a combustor including a pilot nozzle and a plurality of the main nozzles as mentioned above.

A third aspect of the present invention is a method for manufacturing the main nozzle, the method includes directly drawing the temperature sensors on the main nozzle body using a drawing device.

According to such a configuration, it is possible to make the temperature sensors thin. Accordingly, turbulence of flow caused by the temperature sensors can be reduced. In addition, it is possible to readily form the plurality of temperature sensors.

Advantageous Effects of Invention

According to the present invention, since the plurality of temperature sensors are installed on an outer surface of the main nozzle body, detailed monitoring of temperature of the main nozzle body can be performed. Specifically, it is possible to understand the temperature distribution in a plane with a plurality of measurement points.

In addition, since the temperature sensors are installed on the tangential line on which a flow velocity of the fluid slows down, the flashback can be easily detected when the air-fuel premixture formed by swirl of the air is combusted. That is, since the flow velocity of the fluid slows down on the tangential line, the risk of the flashback becomes high, but by providing the temperature sensor at the corresponding position, it is possible to easily detect the flashback.

DESCRIPTION OF EMBODIMENTS

Hereinafter, a gas turbine (rotating machine) including a combustor of an embodiment of the present invention will be described in detail with reference to the drawings.

Figure 1:
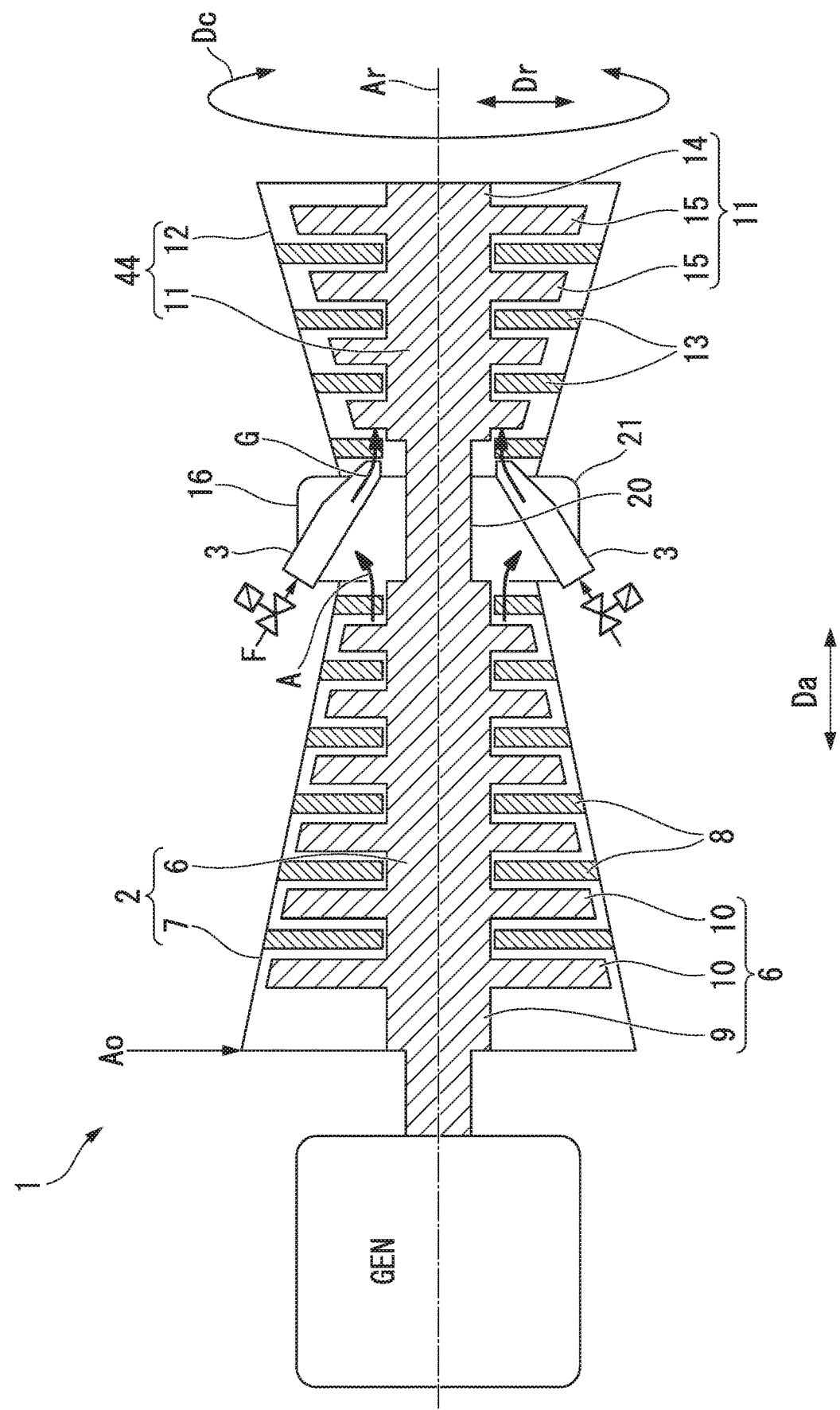
FIG. 1 is a schematic overall side view of a gas turbine of an embodiment of the present invention.

As shown in FIG. 1, a gas turbine 1 of the present embodiment includes a compressor 2 that compresses outside air Ao to generate compressed air A, a plurality of combustors 3 that combust a fuel F in the compressed air A to generate a combustion gas G, and a turbine 4 that is driven by the combustion gas G.

The compressor 2 has a compressor rotor 6 that rotates around an axial line Ar of a gas turbine, a compressor casing 7 that rotatably covers the compressor rotor 6, and a plurality of stationary blade cascades 8 of the compressor.

In the following description, a direction in which the axial line Ar extends will be referred to as a gas turbine axial direction Da. In addition, a circumferential direction around the axial line Ar will be simply referred to as a circumferential direction Dc, and a direction perpendicular to the axial line Ar will be referred to as a radial direction Dr. A side away from the axial line Ar in the radial direction Dr is a radially outward side, and a side toward the axial line Ar is a radially inward side.

The compressor rotor 6 has a compressor rotor shaft 9 extending in the gas turbine axial direction Da along in the axial line Ar, and a plurality of moving blade cascades 10 of the compressor that are attached to the compressor rotor shaft 9. The plurality of moving blade cascades 10 of the compressor are aligned in the gas turbine axial direction Da. Each of the moving blade cascades 10 of the compressor is composed of a plurality of moving blades aligned in the circumferential direction Dc. The stationary blade cascades 8 of the compressor are disposed on the downstream side of each of the plurality of the moving blade cascades 10 of the compressor. Each of the stationary blade cascades 8 of the compressor is fixed inside the compressor casing 7. Each of the stationary blade cascades 8 of the compressor is composed of a plurality of stationary blades aligned in the circumferential direction Dc.

The turbine 4 has a turbine rotor 11 that rotates around the axial line Ar, a turbine casing 12 that rotatably covers the turbine rotor 11, and a plurality of stationary blade cascades 13 of the turbine. The turbine rotor 11 has a turbine rotor shaft 14 extending in the axial line Ar in the gas turbine axial direction Da, and a plurality of moving blade cascades 15 of the turbine that are attached to the turbine rotor shaft 14.

The plurality of moving blade cascades 15 of the turbine are aligned in the gas turbine axial direction Da. Each of the moving blade cascades 15 of the turbine is composed of a plurality of moving blades aligned in the circumferential direction Dc. The stationary blade cascades 13 of the turbine are disposed on the upstream side of each of the plurality of the moving blade cascades 15 of the turbine. Each of the stationary blade cascades 13 of the turbine is fixed inside the turbine casing 12. Each of the stationary blade cascades 13 of the turbine is composed of a plurality of stationary blades of the turbine aligned in the circumferential direction Dc.

The gas turbine 1 further includes a tubular intermediate casing 16 with the axial line Ar as a center. The intermediate casing 16 is disposed between the compressor casing 7 and the turbine casing 12 in the gas turbine axial direction Da. The compressor casing 7, the intermediate casing 16, and the turbine casing 12 are connected to each other to form a gas turbine casing 21. The compressor rotor 6 and the turbine rotor 11 are positioned on the same axial line Ar and are connected to each other to form a gas turbine rotor 20. A rotor of an electrical generator GEN, for example, is connected to the gas turbine rotor 20.

The combustor 3 supplies the fuel F to the compressed air A compressed by the compressor 2, thereby generating the high temperature and high pressure combustion gas G. The plurality of combustors 3 are fixed to the intermediate casing 16 with an interval therebetween in the circumferential direction Dc.

Figure 2:
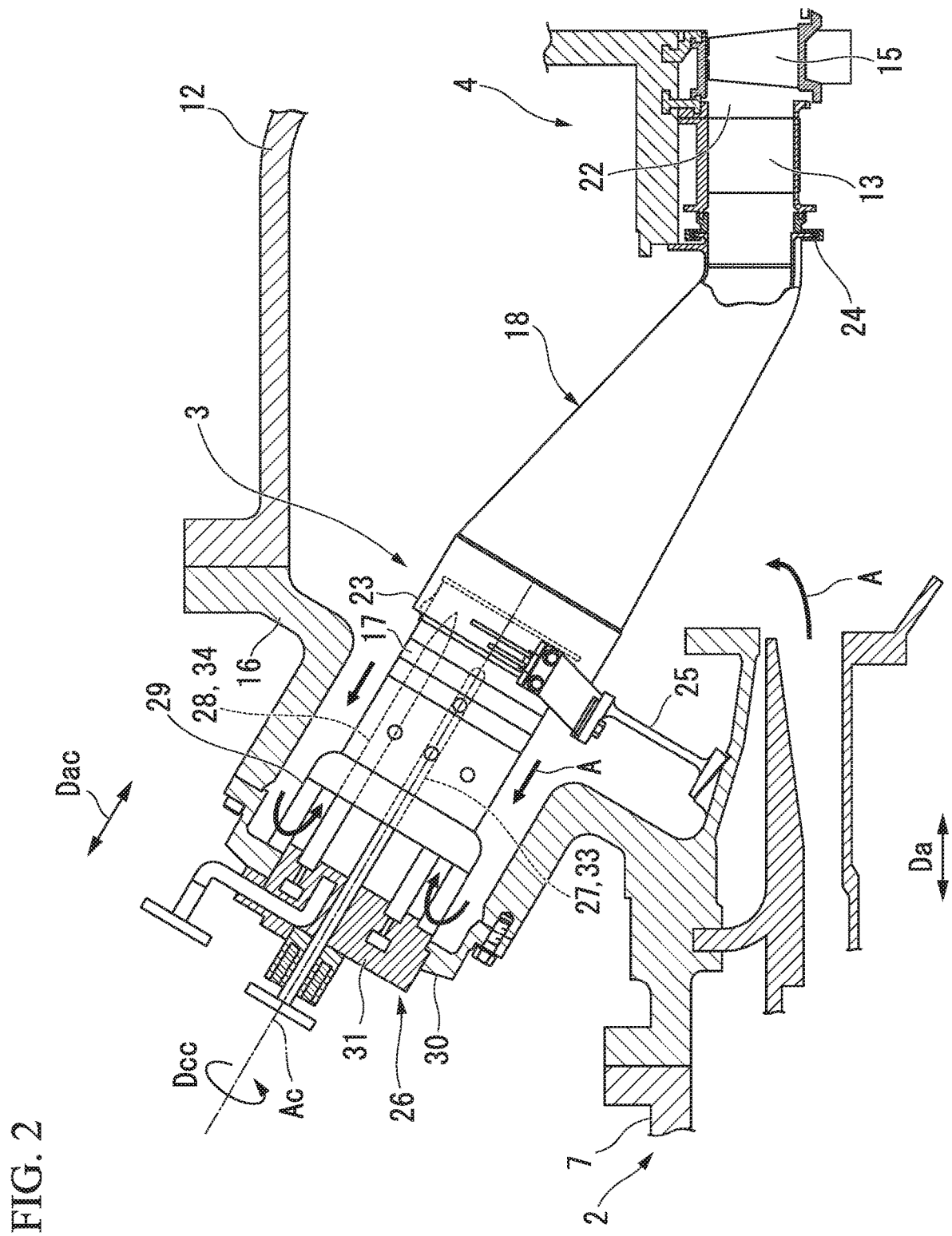
FIG. 2 is an enlarged cross-sectional view of the periphery of a combustor of the gas turbine of the embodiment of the present invention.

As shown in FIG. 2, the combustor 3 has a fuel injector 26 that injects the fuel F together with the compressed air A, an inner tube 17 that surrounds the fuel injector 26 from an outer peripheral side, and a tail tube 18 (tail tube for the combustor) that is connected to a downstream side of the inner tube 17 to extend further downstream. The tail tube 18 sends a high temperature and high pressure combustion gas G to a combustion gas passage 22 in the turbine casing 12.

The fuel injector 26 has a pilot burner 27 that is disposed on an axial line Ac of the combustor, a plurality of main burners 28 that are disposed at equal intervals in a circumferential direction with the axial line Ac as a center (hereinafter, the circumferential direction will be referred to as combustor circumferential direction Dcc), a tubular burner-holding tube 29, a combustor top flange 30 that is attached to the intermediate casing 16, and a nozzle base stand 31 that is fixed to the combustor top flange 30. In the following description, a direction in which the axial line Ac extends will be referred to as a combustor axial direction Dac.

The pilot burner 27 has a pilot nozzle 33 that extends in the combustor axial direction Dac. A base end of the pilot nozzle 33 is fixed to the nozzle base stand 31. The main burner 28 has a main nozzle 34 that extends in the combustor axial direction Dac. A base end of the main nozzle 34 is fixed to the nozzle base stand 31.

The burner-holding tube 29 covers outer peripheral sides of the pilot burner 27 and the plurality of main burners 28. The burner-holding tube 29 is also fixed to the nozzle base stand 31.

The combustor top flange 30 protrudes from the nozzle base stand 31 in a radial direction with respect to the axial line Ac. The combustor top flange 30 is annularly shaped around the axial line Ac.

Although not shown, a plurality of fuel pipes that supply the fuel F to the plurality of combustors 3, a plurality of cooling medium pipes that supply a cooling medium to a high temperature component in contact with the high temperature combustion gas G in the gas turbine 1, and the like are provided in a region including an outer peripheral surface of the intermediate casing 16 at the outer peripheral side of the intermediate casing 16.

Figure 3:
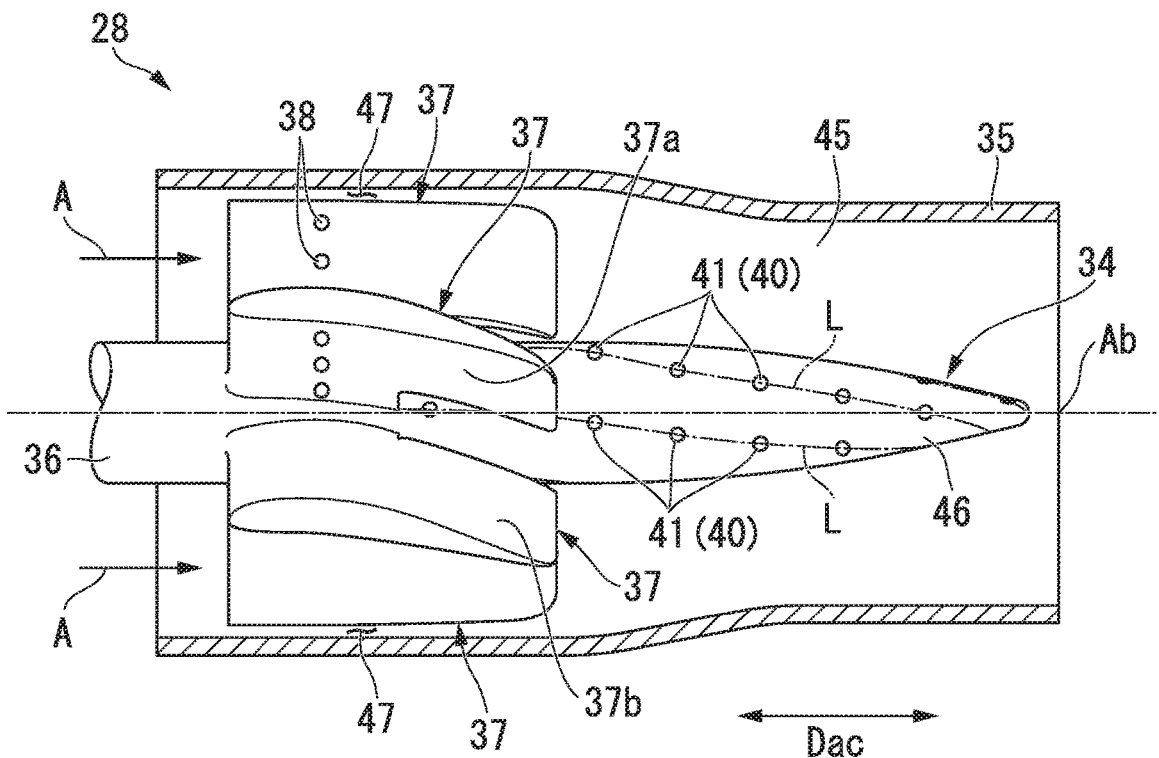
FIG. 3 is a side view of a main nozzle of the combustor of the embodiment of the present invention.

As shown in FIG. 3, the main burner 28 has the main nozzle 34, and a main burner tube 35 that covers the outer periphery of the main nozzle 34. The main nozzle 34 has a main nozzle body 36 that is a shaft-like body extending in a direction of an axial line Ab of the burner that is parallel to the axial line Ac (refer to FIG. 2), a plurality of swirl vanes 37 that allow the compressed air A to swirl around the axial line Ab, and a plurality of temperature sensors 40 that are installed on the main nozzle body 36.

The main burner tube 35 is disposed concentrically towards the main nozzle 34 while being in a state of surrounding the main nozzle 34. A annular-shaped air passage 45 is formed between an outer peripheral surface of the main nozzle body 36 and an inner peripheral surface of the main burner tube 35. In the air passage 45, the compressed air A circulates from an upstream side (left side in FIG. 3) to a downstream side (right side in FIG. 3).

Each of the swirl vanes 37 of the main nozzle 34 protrudes radially outward from the outer peripheral surface of the main nozzle body 36. The swirl vane 37 is formed to allow the air-fuel premixture to swirl around the axial line Ab, which circulates on the downstream side.

The main nozzle body 36 has a pointed distal end portion 46 installed on the downstream side of the main nozzle body 36. The distal end portion 46 gradually narrows toward the downstream side. In other words, the distal end portion 46 is formed to have a tapered shape that tapers toward the distal end on the downstream side.

In each swirl vane 37, a plurality of fuel injection holes 38 for injecting fuel (gas fuel) are formed. Inside the main nozzle body 36, a fuel flow path (not shown) for supplying the fuel to the fuel injection hole 38 of the swirl vane 37 is formed.

A clearance 47 (clearance) is provided between an end surface of an outer peripheral side (tip) of each swirl vane 37 and an inner peripheral surface of the main burner tube 35.

A ventral surface 37a of the swirl vane 37 has a positive pressure and a dorsal surface 37b has a negative pressure, and thus there is a pressure difference between the dorsal surface 37b and the ventral surface 37a. For this reason, a leakage flow of the compressed air A that flows around from the ventral surface 37a to the dorsal surface 37b through the clearance 47 occurs. The leakage flow of the compressed air A, and the compressed air A circulating in the air passage 45 in the direction of the axial line Ab interact, and thus generate a vortex air flow. By the vortex air flow, the fuel that is injected from the fuel injection hole 38 and evaporated to be atomized is more effectively mixed with the compressed air A, which promotes homogenization of the air-fuel premixture.

The temperature sensor 40 is a thermocouple that measures a temperature difference through a thermoelectromotive force generated at a joint (measurement point) of ends of two kinds of metal wires which are brought into contact with each other in a produced circuit.

Figure 5:
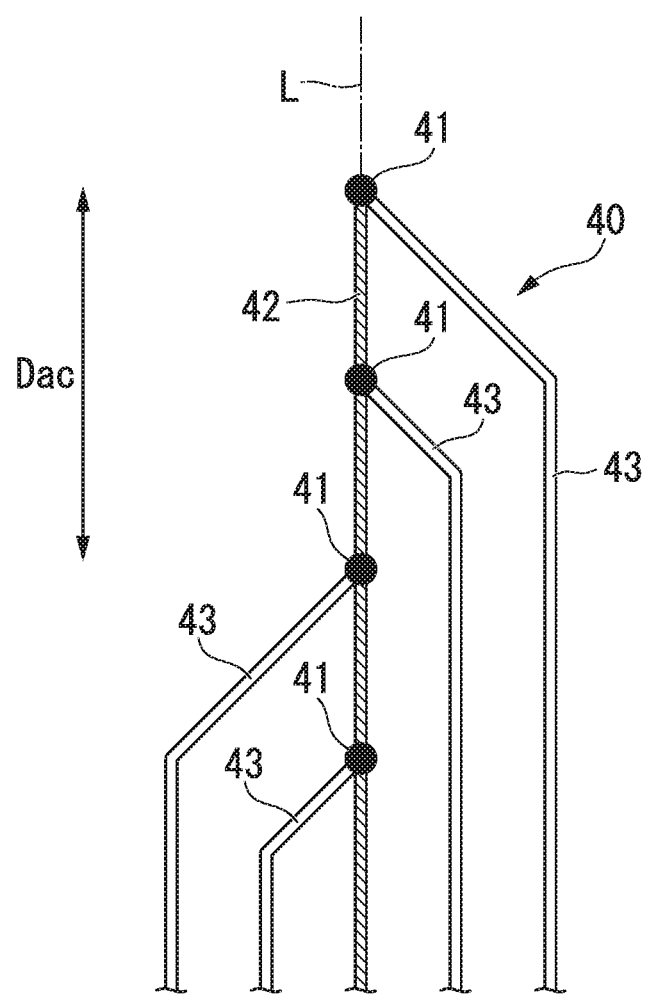
FIG. 5 is a schematic diagram of the temperature sensors of the embodiment of the present invention.

Each of the temperature sensors 40 has a measurement point 41 which is a point where a temperature is measured, and a first metallic wire portion 42 and a second metallic wire portion 43 (refer to FIG. 5). The measurement point 41 is a joint between the first metallic wire portion 42 and the second metallic wire portion 43.

Figure 4:
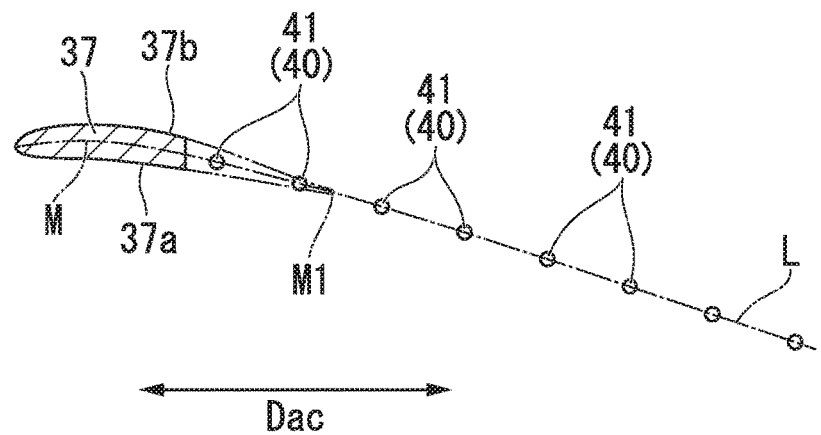
FIG. 4 is a schematic view showing the disposition of temperature sensors provided on the main nozzle of the embodiment of the present invention.

The inventors of the present invention have found that, on the main nozzle body 36, the flow velocity of the fluid becomes to slow down along an extension line of a mean line M, which is drawn between the ventral surface 37a and the dorsal surface 37b in a wing profile of the swirl vane 37 (refer to FIG. 4).

As shown in FIG. 4, a plurality of measurement points 41 are set on the main nozzle body so as to be disposed along a tangential line L to the mean line M of the swirl vane 37, which is drawn between the ventral surface 37a and the dorsal surface 37b of the swirl vane 37, at a downstream end portion M1 of the swirl vane 37. Also, the plurality of measurement points 41 are provided on the tangential line L at intervals in the combustor axial direction Dac. The tangential line L is a virtual line extending in the combustor axial direction Dac on the outer surface of the main nozzle body 36. The tangential line L is formed in a spiral shape around the axial line Ab. The number of the tangential lines L corresponds to that of the swirl vanes 37.

It is preferable that the intervals between the measurement points 41 in the combustor axial direction Dac be set to be approximately the same as the interval between the tangential lines L adjacent to each other in the circumferential direction around the axial line Ab. Accordingly, the intervals between the measurement points 41 adjacent to each other in the circumferential direction are approximately the same as the intervals between the measurement points 41 adjacent to each other in the combustor axial direction Dac. Therefore, the measurement points 41 are equally disposed on the outer surface of the main nozzle body 36.

Next, the temperature sensor 40 will be described in detail.

As shown in FIG. 5, the plurality of measurement points 41 of the temperature sensor 40 are disposed on the tangential line L. The first metallic wire portion 42 extends on the tangential line L. The second metallic wire portion 43 first extends from the respective measurement point 41 in a direction intersecting the tangential line L, and then extends in the tangential line L. That is, in the plurality of temperature sensors 40, the first metallic wire portion 42 is common to the plurality of measurement points 41.

Line widths of the first metallic wire portion 42 and the second metallic wire portion 43 can be set to, for example, 250 μm. In addition, the thickness of the first metallic wire portion 42 and the second metallic wire portion 43 can be set to, for example, 25 μm.

As a metal constituting the first metallic wire portion 42 and the second metallic wire portion 43, it is preferable to use platinum suitable for high temperature measurement, or a platinum-rhodium alloy.

The plurality of temperature sensors 40 are connected to a measuring instrument (not shown). A user can see a metal temperature of the main nozzle body 36 measured by the plurality of temperature sensors 40 via the measuring instrument.

Next, a method for manufacturing the main nozzle 34 will be described.

The method for manufacturing the main nozzle 34 of the present embodiment includes a main-nozzle-body-manufacturing step for manufacturing the main nozzle body 36, and a temperature-sensor-forming step for forming the temperature sensors 40.

In the temperature-sensor-forming step, the temperature sensors 40 can be formed by using a drawing device that directly draws the first metallic wire portion 42 and the second metallic wire portion 43. As the drawing device, a device capable of continuously disposing a linear metal, for example, a welding robot or a three-dimensional (3D) printer for a metal, can be employed. A welding device such as a laser metal deposition device (hereinafter referred to as LMD) can also be employed.

In the temperature-sensor-forming step, the first metallic wire portion 42 and the second metallic wire portion 43 constituting the temperature sensor 40 are directly drawn on the main nozzle body 36.

Next, operation and actions of the gas turbine 1 of the present embodiment will be described.

The compressor 2 sucks in and compresses the outside air Ao. The air compressed by the compressor 2 is introduced into the main burner 28 and the pilot burner 27 of the combustor 3. The fuel is supplied to the main burner 28 and the pilot burner 27 from a fuel supply source. The main burner 28 ejects a premixed gas, which is obtained by premixing the fuel and the air into the tail tube 18. The premixed gas undergoes premixed combustion in the tail tube 18. In addition, the pilot burner 27 ejects the fuel and the air into the tail tube 18. This fuel undergoes diffusion combustion or premixed combustion in the tail tube 18. The high temperature and high pressure combustion gas G generated by the combustion of the fuel in the tail tube 18 is guided into the combustion gas passage 22 of the turbine 4 and rotates the turbine rotor 11.

The compressed air A compressed by the compressor 2 is introduced into the main burner tube 35 from an upstream end thereof. The plurality of swirl vanes 37 in the main burner tube 35 allow the compressed air A to swirl around the axial line Ab. The fuel is injected into the main burner tube 35 from the fuel injection holes 38 of the plurality of swirl vanes 37.

The fuel injected from the swirl vanes 37 and the compressed air A flowing downstream while swirling are premixed in the main burner tube 35, and then are ejected into the tail tube 18 from the downstream end of the main burner tube 35 as the air-fuel premixture.

Mixing of the fuel injected from the fuel injection holes 38 of the plurality of swirl vanes 37 to the inside of the main burner tube 35 with the compressed air A is promoted by the swirling flow generated by the plurality of swirl vanes 37. In addition, since the air-fuel premixture is ejected from the main burner tube 35 into the tail tube 18 while swirling, a flame holding effect on the premixed flame formed by the combustion of the air-fuel premixture is improved.

According to the above-described embodiment, by providing the plurality of temperature sensors 40 on the outer surface of the main nozzle body 36, more detailed monitoring of temperature by the main nozzle body 36 becomes possible. Specifically, it is possible to see the temperature distribution in a plane with the plurality of measurement points 41.

In addition, by providing the measurement points 41 on the tangential line L on which the flow velocity of the fluid slows down, detection of the flashback becomes easy when the air-fuel premixture formed by swirling is combusted. That is, since the flow velocity of the fluid slows down on the tangential line L, the risk of the flashback becomes high, but by providing the temperature sensor 40 having the measurement points 41 at the corresponding position, it is possible to easily detect the flashback.

In addition, by disposing the plurality of measurement points 41 on the outer surface of the main nozzle body 36 rather than on the distal end of the main nozzle body 36, it is possible to quickly detect the flashback as compared with the related art.

In addition, by directly drawing the temperature sensors 40 on the main nozzle body 36 using the drawing device, it is possible to make the temperature sensors 40 thin. Accordingly, turbulence of flow caused by the temperature sensors can be reduced. Furthermore, it is possible to readily form the plurality of temperature sensors 40. Furthermore, the widths of the first metallic wire portion 42 and the second metallic wire portion 43 constituting the temperature sensor 40 can be thinned.

In addition, with the first metallic wire portion 42 common to the plurality of measurement points 41, the space required for the temperature sensor 40 can be reduced.

Hereinbefore, the embodiments of the present invention have been described in detail with reference to the drawings, but the specific configuration is not limited to these embodiments, and design changes and the like within the scope not departing from the gist of the present invention are also included.

In the above-described embodiments, the thermocouple has been employed as the temperature sensor 40, but the temperature sensor is not limited thereto, and any well-known device may be employed as long as the device can be disposed on the surface of the main nozzle body 36.

INDUSTRIAL APPLICABILITY

According to the present invention, by providing the plurality of temperature sensors on the outer surface of the main nozzle body, more detailed monitoring of temperature by the main nozzle body becomes possible. Specifically, it is possible to see the temperature distribution in a plane with the plurality of measurement points.

In addition, by providing the temperature sensor on the tangential line on which the flow velocity of the fluid slows down, detection of the flashback becomes easy when the air-fuel premixture formed by swirling is combusted. That is, since the flow velocity of the fluid slows down on the tangential line, the risk of the flashback becomes high, but by providing the temperature sensor at the corresponding position, it is possible to easily detect the flashback.

REFERENCE SIGNS LIST

1 Gas turbine
2 Compressor
3 Combustor
4 Turbine
6 Compressor rotor
9 Compressor rotor shaft
11 Turbine rotor
14 Turbine rotor shaft
17 Inner tube
18 Tail tube
20 Gas turbine rotor
21 Gas turbine casing
26 Fuel injector
27 Pilot burner
28 Main burner
33 Pilot nozzle
34 Main nozzle
35 Main burner tube
36 Main nozzle body
37 Swirl vane
37a Vane ventral surface
37b Vane dorsal surface
38 Fuel injection hole
40 Temperature sensor
41 Measurement point
42 First metallic wire portion
43 Second metallic wire portion
A Compressed air
Ab Burner axial line (axial line)
Ac Combustor axial line
Ar Gas turbine axial line
Da Gas turbine axial direction
Dac Combustor axial direction (axial direction)
Dc Circumferential direction
Dcc Combustor circumferential direction
Dr Radial direction
G Combustion gas
M Mean line M1 Downstream end portion
L Tangential line

The invention claimed is:

1. A main nozzle of a combustor, a plurality of the main nozzles are to be installed on an outer peripheral side of a pilot nozzle of the combustor at an interval in a circumferential direction of the pilot nozzle, the main nozzle comprising:
   a main nozzle body extending in an axial line thereof;
   a swirl vane protruded from an outer peripheral surface of the main nozzle body in a radial direction of the axial line, and is configured to allow a fluid flowing downstream in a direction of the axial line to swirl around the axial line; and
   a plurality of temperature sensors installed on the main nozzle body so as to be disposed along a tangential line to a mean line which is drawn between a ventral surface and a dorsal surface of the swirl vane, at a downstream end portion of the swirl vane.

2. A combustor comprising:
   a pilot nozzle; and
   the plurality of main nozzles according to claim 1 which are installed on an outer peripheral side of the pilot nozzle at an interval in the circumferential direction.

3. A method for manufacturing the main nozzles as described in claim 1, comprising directly drawing the temperature sensors on the main nozzle body by using a drawing device.

* * * * *